United States Patent
Shibata et al.

(10) Patent No.: US 10,180,164 B2
(45) Date of Patent: Jan. 15, 2019

(54) RESOLVER FOR ROTATION POSITION DETECTION USING RESIN BEARING

(71) Applicant: OKUMA Corporation, Niwa-gun, Aichi (JP)

(72) Inventors: Shinji Shibata, Aichi (JP); Yasunori Kawakami, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 7 days.

(21) Appl. No.: 15/260,870

(22) Filed: Sep. 9, 2016

(65) Prior Publication Data

US 2017/0074681 A1   Mar. 16, 2017

(30) Foreign Application Priority Data

Sep. 15, 2015   (JP) .................. 2015-182072

(51) Int. Cl.
| | |
|---|---|
| *F16C 33/20* | (2006.01) |
| *F16C 17/04* | (2006.01) |
| *G01D 5/20* | (2006.01) |
| *F16C 41/00* | (2006.01) |

(52) U.S. Cl.
CPC .............. *F16C 33/20* (2013.01); *F16C 17/04* (2013.01); *G01D 5/2046* (2013.01); *F16C 41/007* (2013.01); *F16C 2220/04* (2013.01)

(58) Field of Classification Search
CPC ............................. G01R 21/133; G01R 27/14
USPC .................. 324/76.11, 76.61, 76.69
See application file for complete search history.

(56) References Cited

U.S. PATENT DOCUMENTS

| | | | | |
|---|---|---|---|---|
| 6,617,972 B2 * | 9/2003 | Takarada | ............ | G08B 21/0484 324/538 |
| 8,779,729 B2 * | 7/2014 | Shiraishi | ............ | G01R 31/3606 320/134 |
| 2011/0156699 A1 | 6/2011 | Shibata et al. | | |
| 2012/0098518 A1 * | 4/2012 | Unagami | ............ | G01R 22/066 324/74 |
| 2017/0060150 A1 * | 3/2017 | Stefanski | ............... | G05D 23/27 |
| 2018/0036740 A1 * | 2/2018 | Nelson | .................... | B02C 19/18 |
| 2018/0059176 A1 * | 3/2018 | Ding | .................... | G01R 1/0433 |

FOREIGN PATENT DOCUMENTS

JP          5524600 B2     6/2014

* cited by examiner

*Primary Examiner* — Giovanni Astacio-Oquendo
(74) *Attorney, Agent, or Firm* — Cantor Colburn LLP

(57) ABSTRACT

A resolver for a rotation position detection device comprises a rotor portion having a resin gear having a hole formed at a center portion thereof through which a stationary shaft passes, and a rotor core connected to the resin gear; and a stator portion having the stationary shaft, an excitation wiring and a detection wiring, a back core, and a resin housing, wherein the excitation wiring and the detection wiring are arranged around the stationary shaft at a constant distance from the stationary shaft in a diameter direction, the back core is adjacent to or in contact with the stationary shaft, and the resin gear has a shape whose central portion projects in the shaft direction so as to be in contact with the back core.

4 Claims, 3 Drawing Sheets

RESOLVER FOR ROTATION POSITION DETECTION USING RESIN BEARING

CROSS REFERENCE TO RELATED APPLICATION

The entire disclosure of Japanese Patent Application No. 2015-182072 filed on Sep. 15, 2015 including specification, claims, drawings and abstract is incorporated herein by reference in its entirety.

TECHNICAL FIELD

The present disclosure relates to improvement of a position detection device for use in detection of the amount of rotation angle of a feed shaft, etc. of a machine tool, and in particular to a resolver using a resin bearing.

BACKGROUND

There is available a resolver disclosed in JP 5524600 B as a detection device for detecting rotation, using a decelerator and a plurality of resolvers.

FIG. 4 is a cross sectional view of a conventional encoder disclosed in JP 5524600 B in a direction perpendicular to the shaft direction thereof. FIG. 5 is a cross sectional view along line B-B shown in FIG. 4. FIG. 6 is a cross sectional view along line A-A shown in FIG. 4. A rotor 60 is assembled to an input shaft 19 and rotates once as the input shaft 19 rotates once. Also, a gear 25, also assembled to the input shaft 19, is engaged with a gear 26 and drives a shaft 20 and a gear 27. The gear 27 is engaged with brass gears 28, 30 and drives respective rotors 62, 64. When the gears are assembled as described above to thereby constitute a deceleration mechanism, the rotor 62 rotates once as the input shaft 19 rotates twenty-four times, and the rotor 64 rotates once as the input shaft 19 rotates twenty-five times. FIG. 3 is a cross sectional view of a resolver, showing in an enlarged manner a left side resolver portion shown in FIG. 6 upside down. Each of the brass gears 28, 30 has a hole formed at the center thereof through which a respective metal bearing 93, 94 passes. Each of the brass gears 28, 30 is formed through lathe machining and subsequent hobbing machining with respect to the outer diameter portion thereof. Also, when the brass gears 28, 30 and the metal bearings 93, 94 are adhered and assembled such that stationary shafts 12, 13 are inserted into holes formed on the respective metal bearings 93, 94, and the outside wheels of the respective metal bearings 93, 94 are inserted into holes formed on the respective brass gears 28, 30, movement of the brass gears 28, 30 in the radial direction and the thrust direction is restricted. Also, the brass gears 28, 30 are engaged with the gear 27, and rotate at a predetermined reduction ratio relative to the input shaft. Each of the stationary shafts 12, 13 is made of metal material such as steel and pushed into an aluminum casing 81, and fixed therein. Each of the rotor cores 62, 64 has a deflected outer shape, and is made of soft magnetic material, such as ferrite, electromagnetic stainless, or silicon steel plate, and adhered and fixed to the outside wheel of the respective metal bearing 93, 94 and the respective brass gear 28, 30.

A stator portion 66 has four salient poles 101, 102, 103, 104 formed thereon. These four salient poles are arranged along the outer circumference of the rotor core 62 concentrically with the rotation center of the rotor 62. Around each of the salient poles, a two-phase detection wiring 16 and an excitation wiring 17 are arranged such that magnetic resistance will change as the air gap between the rotor core 62 and the tip end of the salient pole of the stator portion 66 changes as the rotor core 62 rotates. This change causes the induced voltage of the two-phase detection wiring 16 to change, which enables detection of the rotation position of the rotor core 62. A rotation position of the rotor core 64 also can be detected in a similar manner.

Use of the bearings 93, 94, such as a ball bearing etc., for receiving a radial load and a thrust load with the resolver rotation shaft shown in FIG. 6 increases costs. Also, although use of resin for the brass gears 28, 30 and a housing can reduce costs and ensure small variation of backlash due to change in temperature, use of resin for the thrust bearing results in a problem of increasing the amount of abrasion of the bearing.

SUMMARY

In order to solve the above-described problem, there is provided a resolver for a rotation position detection device for detecting a rotation amount of an input shaft, using a decelerator and a resolver, comprising a rotor portion having a resin gear having a hole formed at a center portion thereof through which a stationary shaft passes, and a rotor core made of soft magnetic material and connected to the resin gear; and a stator portion having the stationary shaft, an excitation wiring, and a detection wiring arranged opposed to each other relative to the rotor core in a shaft direction, a back core made of soft magnetic metal and arranged on an opposite side of the rotor core with the excitation wiring and the detection wiring sandwiched thereinbetween, and a resin housing for supporting the back core and the stationary shaft, wherein the excitation wiring and the detection wiring are arranged around the stationary shaft at predetermined distances, respectively, from the stationary shaft in a diameter direction, the back core is adjacent to or in contact with the stationary shaft, and the resin gear has a shape of which central portion projects in the shaft direction so as to be in contact with the back core.

According to this disclosure, the projecting portion of the resin gear, the projecting portion being in contact with the back core, also functions as a thrust bearing for allowing rotation of the resin gear while restricting movement of the resin gear in the thrust direction. That is, according to the present disclosure, as it is possible to mold the resin gear and the bearing, using a resin die, as these can be integrally molded using the same material, it is possible to provide an inexpensive resolver for rotation detection. Further, as the back core made of soft magnetic metal has a structure having a function for defining a magnetic path in the thrust direction and for supporting a wear surface on the thrust side, it is possible to provide a small-sized, long-life rotary resolver having a resin bearing with a small amount of abrasion.

BRIEF DESCRIPTION OF DRAWINGS

Embodiment(s) of the present disclosure will be described by reference to the following figures, wherein.

DESCRIPTION OF EMBODIMENTS

In the following, an embodiment of the present disclosure will be described in detail by reference to the drawings. FIG.

Figure 1:
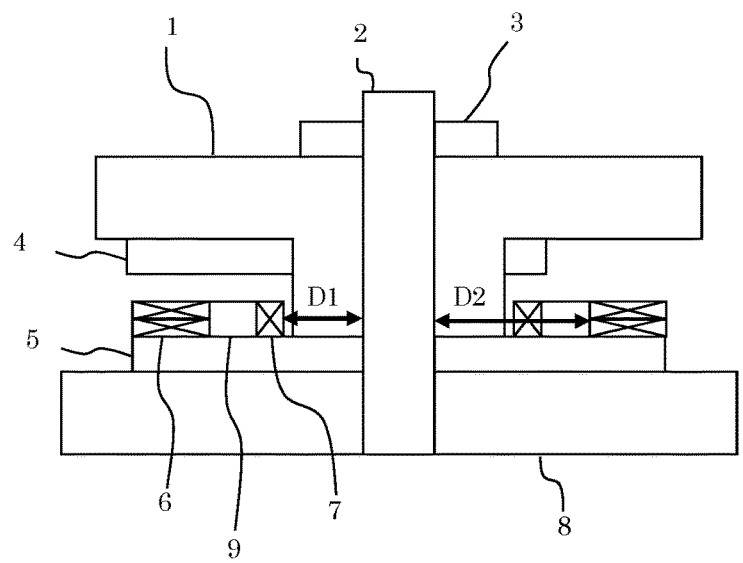
FIG. 1 shows a structure of a rotary resolver according to one embodiment.
Figure 2:
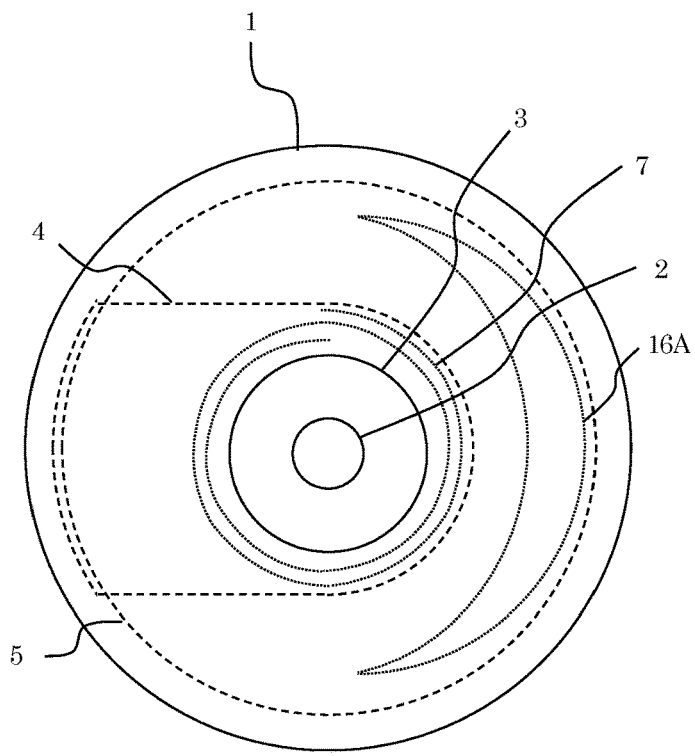
FIG. 2 shows a rotary resolver as viewed from above.
Figure 3:
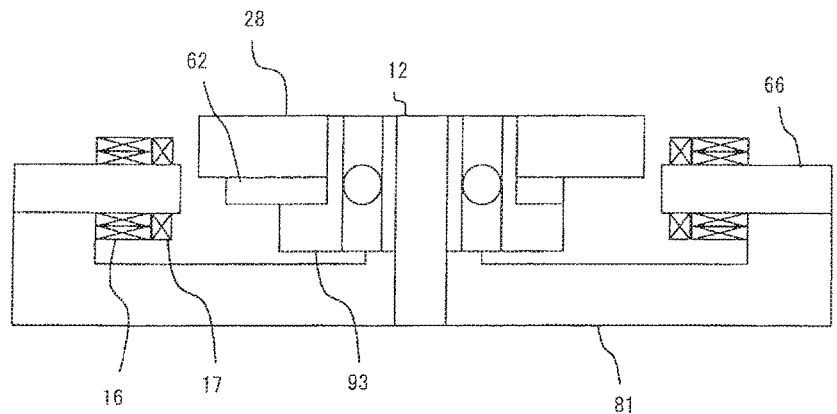
FIG. 3 shows a structure of a conventional rotary resolver.
Figure 4:
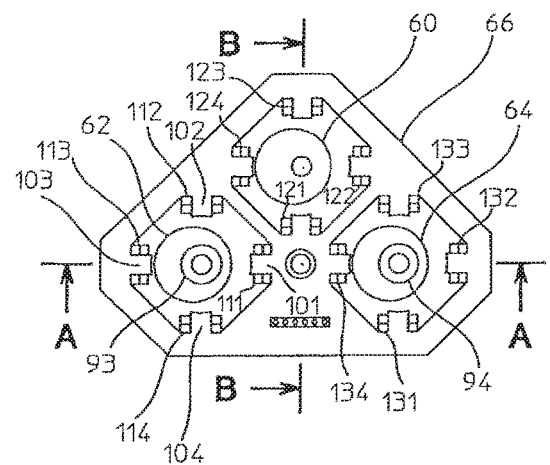
FIG. 4 is a cross sectional view of a conventional encoder in a direction perpendicular to the shaft thereof.
Figure 5:
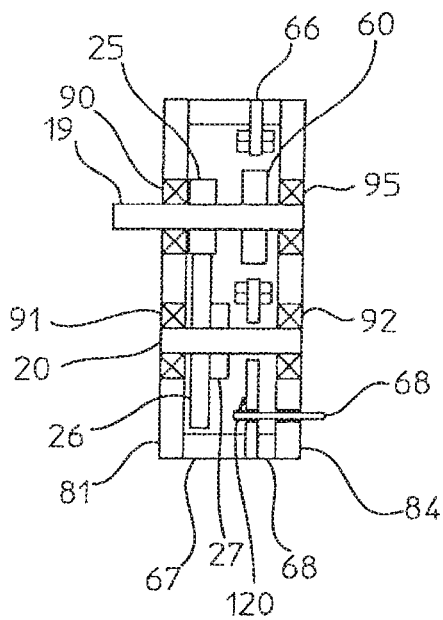
FIG. 5 is a cross sectional view along line B-B in FIG. 4.
Figure 6:
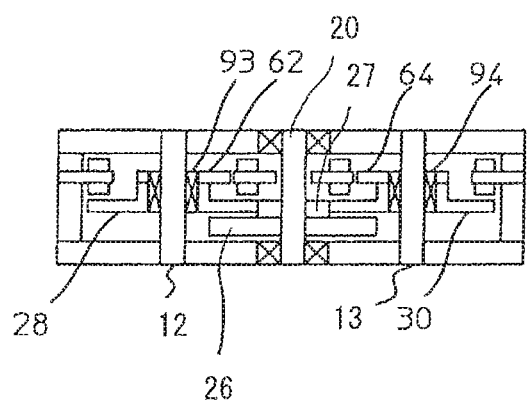
FIG. 6 is a cross sectional view along line A-A in FIG. 4.

1 shows a structure of a resolver for rotation detection according to an embodiment. FIG. 2 shows a resolver shown in FIG. 1 as viewed from above. A structural component similar to one in the conventional encoder shown in FIG. 3 is assigned the same reference numeral, and its description is not repeated below.

A resolver for rotation detection has a resin housing 8 from which a stationary shaft 2 protrudes. The stationary shaft 2 is made of metal material such as steel and machined so as to have a smooth surface. Then, the stationary shaft 2 is pushed into the resin housing 8 and fixed therein.

On the stationary shaft 2, from the side of the resin housing 8, a back core 5, a resin gear 1, and a retaining ring 3 are sequentially inserted. The resin gear 1 has a hole formed at the center thereof, through which the stationary shaft 2 passes, and is integrally molded by means of injection molding, etc. The resin gear 1 has a stepped shape having a major diameter portion having a gear formed on the outer circumference thereof, and a projecting portion having a diameter smaller than that of the major diameter portion and projecting toward the back core 5. Also, a hole is formed at the center of the resin gear 1. By inserting the stationary shaft 2 into the hole, movement of the resin gear 1 in the radial direction is restricted. However, the hole of the resin gear 1 is slightly larger than the stationary shaft 2, so that the resin gear 1 can rotate relative to the stationary shaft 2. Then, the resin gear 1 is engaged with the gear 27, and rotates at a predetermined reduction ratio relative to the input shaft.

The retaining ring 3 is made by stamping a panel having a smooth surface, using a die. The retaining ring 3 is fit to the stationary shaft 2 and fixed thereto. The retaining ring 3 presses the top surface of the resin gear 1 such that the resin gear 1 smoothly and slightly moves in the circumferential direction relative to the retaining ring 3, and defines a fixed position of the resin gear 1 in the thrust direction.

Also, the bottom surface of the projecting portion of the resin gear 1 is in contact with the back core 5. In other words, the resin gear 1 is sandwiched by the back core 5 and the retaining ring 3. As a result, the resin gear 1 has a function of a thrust bearing that allows rotation of the gear around the stationary shaft 2 while movement thereof in the thrust direction is restricted by the retaining ring 3 and the back core 5.

The back core 5 is made using a steel plate made of soft magnetic material having a smooth surface, such as electromagnetic stainless or silicon steel, and processed using a stamping die into a round shape in the same size as or in such a size that surrounds the outside diameter of the two-phase detection wiring 6. Also, the back core 5 is fixed to the resin housing 8 by means of adhesive, etc. so as to be adjacent to or in contact with the stationary shaft 2.

The rotor core 4 is made of soft magnetic material such as ferrite, electromagnetic stainless, or silicon steel plate. The rotor core 4 has a hole through which the stationary shaft 2 and the projecting portion of the resin gear 1 pass. The rotor core 4 is processed into a deflected salient shape such that the maximum outside diameter thereof with the hole as the center is equal to or greater than the outside diameter of the two-phase detection wiring 6, and the minimum outside diameter thereof with the hole as the center is the same as the outside diameter of the excitement wiring 7, and then fixed to the resin gear 1 by means of adhesive, etc.

On the surface of the back core 5, a printed board 9 is mounted. On the printed board 9, the two-phase detection wiring 6 and the excitement wiring 7 are formed as conductor patterns. Also, the printed board 9 has a hole through which the projecting portion formed at the center of the resin gear 1 passes, and is fixed to the back core, etc. by means of adhesive, etc. The two-phase detection wiring 6 and the excitement wiring 7 are arranged around the stationary shaft 2 at predetermined distances D2 and D1, respectively, from the stationary shaft 2 in a diameter direction.

On the printed board 9, the excitement wiring 7 and the two-phase detection wiring 6 are formed concentrically with the rotation center of the rotor core 4. Four two-phase detection wirings 6 are formed at an interval of 90 degrees. The excitement wiring 7 is formed as a conductor pattern swirly around the stationary shaft 2 on the printed board 9 such that the outside diameter thereof is smaller than the inside diameter of the two-phase detection wiring 6, and the inside diameter thereof is larger than the projecting portion at the center of the resin gear 1. The two-phase detection wiring 6 is formed in a crescent shape as a conductor pattern on the printed board 9 such that the inside diameter thereof is larger than the outside diameter of the excitement wiring 7 and the outside diameter thereof is equal to or smaller than the outside diameter of the back core 5.

The two-phase detection wiring 6 and the excitement wiring 7 are connected to a resolver signal position detection circuit (not shown). A magnetic flux generated by the exciting wiring 7 runs around the rotor core 4, passes through the two-phase detection wiring 6, and runs around the back core 5. As a result, a voltage in accordance with the rotation position of the rotor core 4 is generated in the two-phase detection wiring 6, so that the resolver signal circuit can detect the rotation position. Note that two or more such resolvers may be arranged as is in the conventional art. That is, two or more resolvers in this embodiment may be connected to each other via a decelerator device to thereby constitute a rotation position detection device.

With the above-described structure, it is possible to provide an inexpensive, long-life, small-sized resolver for rotation detection.

The invention claimed is:

1. A resolver for a rotation position detection device for detecting a rotation amount of an input shaft, using a decelerator and a resolver, comprising:
  a rotor portion having a resin gear having a hole formed at a center portion thereof through which a stationary shaft passes, and a rotor core made of soft magnetic material and connected to the resin gear; and
  a stator portion having the stationary shaft, an excitation wiring and a detection wiring arranged opposed to each other relative to the rotor core in a shaft direction, a back core made of soft magnetic metal and arranged on an opposite side of the rotor core with the excitation wiring and the detection wiring sandwiched therebetween, and a resin housing for supporting the back core and the stationary shaft,
  wherein
  the excitation wiring and the detection wiring are arranged around the stationary shaft at predetermined distances, respectively, from the stationary shaft in a diameter direction,
  the back core is adjacent to or in contact with the stationary shaft, and
  the resin gear has a shape whose central portion projects in the shaft direction so as to be in contact with the back core.

2. The resolver for rotation position detection according to claim 1, wherein the excitation wiring and the detection wiring are formed as conductor patterns on a common printed board.

3. The resolver for rotation position detection according to claim 2, wherein the stator portion further includes a retaining ring fit and fixed to the stationary shaft, for rotatably supporting the resin gear in cooperation with the back core.

4. The resolver for rotation position detection according to claim 1, wherein the stator portion further includes a retaining ring fit and fixed to the stationary shaft, for rotatably supporting the resin gear in cooperation with the back core.

\* \* \* \* \*